(12) United States Patent
Qiao et al.

(10) Patent No.: US 7,492,899 B2
(45) Date of Patent: Feb. 17, 2009

(54) AUTHENTICATION METHOD FOR MEDIA GATEWAY

(75) Inventors: Kezhi Qiao, Shenzhen (CN); Ming Ni, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 10/566,206

(22) PCT Filed: Dec. 16, 2003

(86) PCT No.: PCT/CN03/01069

§ 371 (c)(1),
(2), (4) Date: Jun. 5, 2006

(87) PCT Pub. No.: WO2005/013558

PCT Pub. Date: Feb. 10, 2005

(65) Prior Publication Data

US 2006/0236101 A1    Oct. 19, 2006

(30) Foreign Application Priority Data

Aug. 5, 2003  (CN) ............................... 03 1 49767

(51) Int. Cl.
*H04L 9/00*  (2006.01)
*H04K 1/00*  (2006.01)
(52) U.S. Cl. ....................... 380/258; 713/176
(58) Field of Classification Search .................. 380/281
See application file for complete search history.

(56) References Cited

U.S. PATENT DOCUMENTS

| | | | |
|---|---|---|---|
| 7,089,211 B1 * | 8/2006 | Trostle et al. ................. | 705/51 |
| 2002/0016913 A1 * | 2/2002 | Wheeler et al. ............. | 713/170 |
| 2002/0087858 A1 * | 7/2002 | Oliver et al. ................. | 713/156 |
| 2004/0255158 A1 * | 12/2004 | Lin et al. ..................... | 713/201 |
| 2005/0220078 A1 * | 10/2005 | Luken ......................... | 370/352 |
| 2006/0274899 A1 * | 12/2006 | Zhu et al. .................... | 380/281 |

FOREIGN PATENT DOCUMENTS

| | | |
|---|---|---|
| CN | A 1308472 | 8/2001 |
| CN | A 1411224 | 4/2003 |
| WO | 02054201 A2 | 7/2002 |

OTHER PUBLICATIONS

Greens, N. et al. RFC: 2805: Media Gateway Control Protocol Architecture and Requirements. Apr. 2000. p. 1-42.*

(Continued)

*Primary Examiner*—Christian LaForgia
(74) *Attorney, Agent, or Firm*—Banner & Witcoff, Ltd.

(57) ABSTRACT

The present invention relates to a method of authentication for Media Gateway, comprising: setting up an initial key for validating initial digital signatures between a Media Gateway and a Media Gateway Controller; generating a new shared key having a specific lifetime by performing signaling communication between said Media Gateway and said Media Gateway Controller with said initial key; authenticating calls and responses between said Media Gateway and said Media Gateway Controller with said new shared key; and updating said shared key between said Media Gateway and said Media Gateway Controller if the lifetime of said shared key is expired. The invention can authenticate each call, update the shared key periodically, and prevent calling invalidly effectively.

7 Claims, 2 Drawing Sheets

OTHER PUBLICATIONS

Stallings, William. Cryptography and Network Security: Principles and Practices. 2003. Prentice Hall. 3rd Edition. p. 211-220.*

M. Arango et al. RFC 2705: Media Gateway Control Protocol (MCGP) Version 1.0. Oct. 1999. p. 1-126.*

C. Groves et al. RFC 3525: Gateway Control Protocol Version 1. Jun. 2003. p. 1-200.*

"Corrigendum 1 to Recommendation H.248" Feb. 2002. ITU. p. 1-134.*

Harkins, D. et al. "RFC 2409: The Internet Key Exchange (IKE)" Nov. 1998. p. 1-41.*

Search Report of PCT/CN2003/001069, Jul. 8, 2004, 2 pages.

* cited by examiner

AUTHENTICATION METHOD FOR MEDIA GATEWAY

This application is a National Stage application of co-pending PCT application PCT/CN2003/001069 filed Dec. 16, 2003, which was published in Chinese under PCT Article 21(2) on Feb. 10, 2005, which claims priority from Chinese patent application 03149767.5 filed on Aug. 5, 2003. These applications are incorporated herein by reference in their entirety.

TECHNICAL FIELD OF THE INVENTION

The present invention relates to communication technique, and more particularly, to a method of authentication for Media Gateway with MEGACO/MGCP protocol.

BACKGROUND OF THE INVENTION

Media Gateway Control (MEGACO) protocol is RFC3015 protocol of the Internet Engineering Task Force (IETF).

FIG. 1 shows a system networking diagram for achieving MEGACO protocol. MEGACO protocol employs an idea of separating gateway, which divides a gateway processing signaling and media together into two parts: Media Gateway (MG) and Media Gateway Controller (MGC). MGC controls the operation of MG by MEGACO protocol in such a manner that MGC sends a command to be carried out to MG, and then MG carries it out and returns the result. MGC also processes event requests initiatively sent by MG. Logic relationship in MEGACO protocol is expressed by a connection model. Two basic components of the connection model are contexts and terminations. The context expresses connection and topography relationship between terminations.

Main commands between MGC and MG include SERVICECHANGE, ADD, MODIFY, SUBTRACT, NOTIFY and so on.

In a conventional method of authentication for Media Gateway, after MG registration is finished, MG is authenticated periodically by using a constant key. This has several disadvantages such that firstly if the same key is used for authentication for a long time, it is easy to be decoded by the third party. Secondly, in the method of periodical authentication, it is easy for the third party to make successful authentication between MGC and MG only by filtering the authentication message to real MG, and initiate a call by forging other MG messages. Thirdly, in the method, only MGC authenticates MG, therefore MG may be called by invalid MGC by forging messages.

SUMMARY OF THE INVENTION

One object of the present invention is to provide an improved method of authentication for Media Gateway, which solves the problems in the conventional method of authentication for Media Gateway such that it is easy for the third party to initiate a call by forging MG, to call MG by forging MGC, and to decode the key since the lifetime thereof is short. The method can authenticate each call, update a shared key periodically and prevent calling by using invalid forged messages effectively.

The present invention is achieved by:

The present invention discloses a method of authentication for Media Gateway, comprising: setting up an initial key for validating initial digital signatures between a Media Gateway and a Media Gateway Controller; generating a new shared key having a specific lifetime by performing signaling communication between said Media Gateway and said Media Gateway Controller with said initial key; authenticating calls and responses between said Media Gateway and said Media Gateway Controller with said new shared key; and updating said shared key between said Media Gateway and said Media Gateway Controller if the lifetime of said shared key is expired.

Preferably, the step of generating a new shared key further comprises: initiating a register signaling from said Media Gateway to said Media Gateway Controller to register, wherein said register signaling has a parameter for generating a shared key and a digital signature generated by said initial key; generating a shared key and setting up a lifetime of said shared key after said Media Gateway Controller has validated said Media Gateway with said initial key; initiating a modification command from said Media Gateway Controller to said Media Gateway, wherein said modification command has a parameter for generating the shared key, a digital signature generated by said initial key and a lifetime of a shared key; and generating the shared key and setting up the lifetime of said shared key after said Media Gateway has validated said Media Gateway Controller with said initial key.

Preferably, the step of authenticating further comprises: for each call, attaching a digital signature to each call message from said Media Gateway Controller to said Media Gateway by using said shared key; validating said digital signature in said call message in said Media Gateway by using said shared key, and if it is valid, returning a response message attached with a digital signature using said shared key to said Media Gateway Controller; and validating said digital signature in said response message in said Media Gateway Controller by using said shared key, if it is valid, setting up a call service, otherwise denying the call.

Preferably, the step of updating said shared key further comprises: sending a notification command from said Media Gateway to said Media Gateway Controller, requesting said Media Gateway Controller to generate a new shared key, wherein said notification command has a parameter for generating a shared key and a digital signature generated by an initial key; generating a new shared key and setting up a lifetime of said shared key after said Media Gateway Controller has validated said Media Gateway with said initial key; initiating a modification command from said Media Gateway Controller to said Media Gateway, wherein said modify command has a parameter for generating the shared key, a digital signature generated by said initial key and the lifetime of the shared key; and generating the shared key and setting up the lifetime of said shared key after said Media Gateway has validated said Media Gateway Controller with said initial key.

Preferably, the algorithm used to generate a shared key by said Media Gateway Controller and said Media Gateway is different from the algorithm used to generate a digital signature by said Media Gateway Controller and said Media Gateway.

Preferably, a field/packet of an expanded protocol is used to transmit said parameter for generating a shared key and said digital signature.

Preferably, the lifetime of said shared key is time, or the number of times said shared key can be used for authentication.

The advantageous effects of the present method are that: the method can not only update a shared key periodically so that it is not easy to decode a key since the key is used for a long time, authenticate each call initiated by MG, and solve the problem that an invalid call is initiated by the third party by filtering messages, but also prevent MG from being called by invalid MGC.

DETAILED DESCRIPTION OF THE PREFERRED EMBODIMENTS

The present invention discloses a method of authentication for Media Gateway, comprising:

setting the algorithm used to generate a shared key by a Media Gateway Controller and a Media Gateway is $y=f_1(x)$, and setting the algorithm used to generate a digital signature by a Media Gateway Controller and a Media Gateway is $y=f_2(x)$; the appropriate algorithm can be used for the algorithm used to generate a shared key by a Media Gateway Controller and a Media Gateway and the algorithm used to generate a digital signature by a Media Gateway Controller and a Media Gateway according to the safety level required, and it may not be defined by the present invention.

A key S for validating initial digital signatures is set up between a Media Gateway and a Media Gateway Controller. The key S of the Media Gateway and the Media Gateway Controller can be different if only it can validate digital signature of the other. A field/packet of an expanded MEGACO protocol can be used to transmit the key and parameter.

A register signaling is initiated from a Media Gateway to a Media Gateway Controller to register, wherein the register signaling has a parameter for generating a shared key and a digital signature. A shared key is generated after the Media Gateway Controller has validated the Media Gateway. A modification command is initiated from the Media Gateway Controller to the Media Gateway, wherein the modification command has a parameter for generating a shared key, a digital signature and a lifetime of a shared key. A shared key is generated after the Media Gateway has validated the Media Gateway Controller.

In subsequent each call and each response between the Media Gateway and the Media Gateway Controller, signatures are attached to each call and each response between the Media Gateway and the Media Gateway Controller by using the shared key. If they are valid after being validated each other, a call service is set up, otherwise the call is denied.

After the lifetime of the shared key is expired, the Media Gateway Controller makes the initial key invalid, and Media Gateway requests the Media Gateway Controller by using a notification command to generate a new shared key and acquire a lifetime of a new key.

The key is thus updated periodically, and calls are authenticated by a new key.

An embodiment of the present invention will be illustrated below by referring the drawings.

Figure 1:
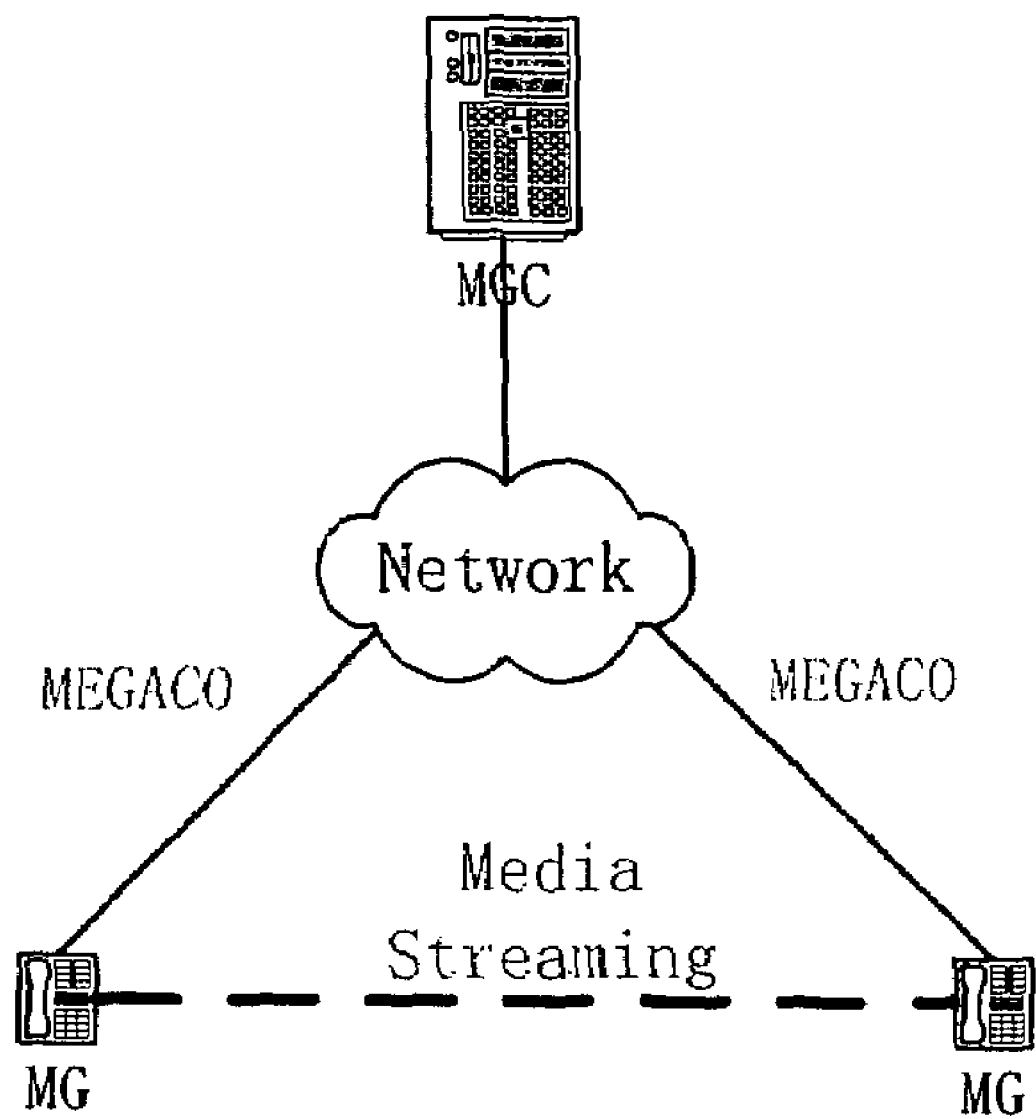
FIG. 1 shows a principle diagram of MEGACO protocol system.
Figure 2:
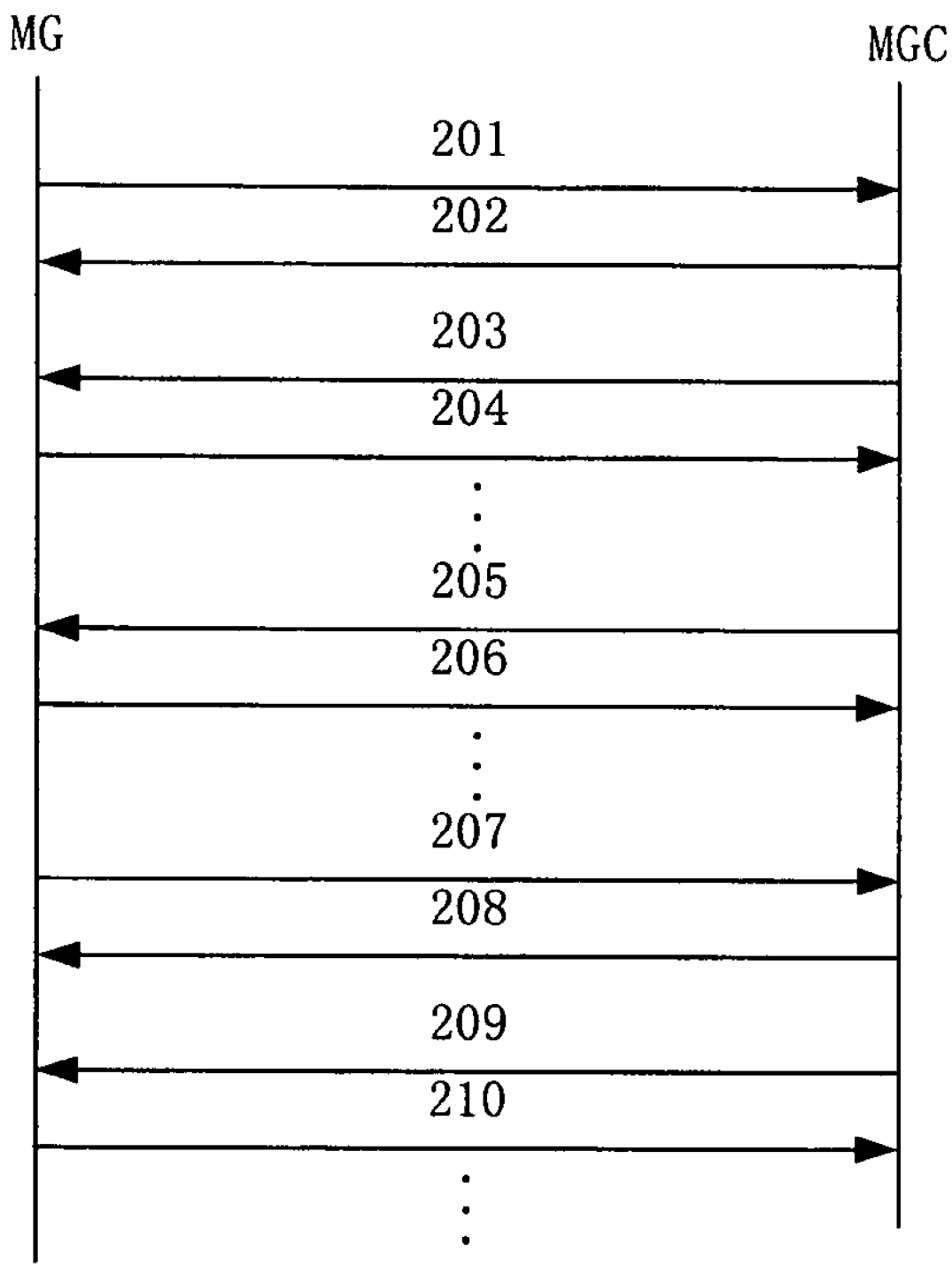
FIG. 2 is a flow chart showing a method of authentication for Media Gateway of the present invention.

FIG. 2 is a flow chart showing a method of authentication for Media Gateway of the present invention. An initial key S is set up between a Media Gateway and a Media Gateway Controller.

201) A register message is initiated from a Media Gateway to a Media Gateway Controller, wherein the register message has a parameter M for generating a shared key by the Media Gateway Controller and a digital signature generated by the key S for the parameter M of the shared key or the register message.

202) The digital signature is validated by using the key S after the Media Gateway Controller receives the message. If it is valid, a shared key S' is generated by using the parameter M of the shared key, and a response is sent to the Media Gateway.

203) A modification message is initiated from the Media Gateway Controller to the Media Gateway, wherein the modification message has a parameter N for generating a shared key by the Media Gateway and a digital signature generated by the key S for the parameter N of the shared key or the whole message, and also has a lifetime of a new shared key wherein the lifetime is time, or the number of times the new shared key can be used for authentication.

204) The digital signature is validated by using the key S after the Media Gateway receives the message. If it is valid, a shared key S' is generated by using the parameter M of the shared key, and a response is sent to the Media Gateway Controller.

205) In a message (such as ADD) set up in subsequent each call, a digital signature is attached by the Media Gateway Controller by using a new shared key S'.

206) The digital signature is validated by using the new shared key S' after the Media Gateway receives the message. If it is valid, the Media Gateway Controller is valid. For a response of the Media Gateway Controller, a digital signature is also attached by using the new shared key S'. The digital signature is validated by using the new shared key S' after the Media Gateway Controller receives. If it is valid, a call is set up, otherwise, the Media Gateway is invalid and the call is denied. The same method is used for the periodical authentication between the Media Gateway and the Media Gateway Controller.

207) After the lifetime of the shared key set up by the Media Gateway Controller is expired, a notification message is sent from the Media Gateway to the Media Gateway Controller, wherein the notification message has a parameter M' for generating a shared key by the Media Gateway Controller and a digital signature generated by the key S for the parameter M' of the shared key or the whole message.

208) The digital signature is validated by using the key S after the Media Gateway Controller receives the message. If it is valid, a shared key S" is generated by using the parameter M' of the shared key, and a response is sent to the Media Gateway.

209) A modification message is initiated from the Media Gateway Controller to the Media Gateway, wherein the modification message has a parameter N' for generating a shared key by the Media Gateway and a digital signature generated by the key S for the parameter N' of the shared key or the whole message, and also has a lifetime of a new shared key. A new shared key S" is generated by using the parameter N' of the shared key by the Media Gateway, and subsequent calls are authenticated and authenticated periodically by using the new shared key S".

210) A response is sent from the Media Gateway to the Media Gateway Controller.

After the lifetime of the new shared key S" is expired, a new shared key S'" is generated by repeating steps 207)-210), and so on.

While the method of authentication for Media Gateway by using MEGACO protocol has been particularly described with respect to the embodiment thereof, it will be understood by those skilled in the art that many modifications and changes in forms and details may be made without departing from the scope and spirit of the present invention. For example, due to the similarity of MEGACO protocol and MGCP protocol, the technical solution of the present invention is also appropriate for Media Gateway by using MGCP protocol. It is therefore that the embodiments described above are intended to illustrate but not to limit, and many modifications and changes may fall within the scope of the appended claims.

The invention claimed is:

1. A method of authentication for Media Gateway, characterized in that the method comprises:
   providing each of a Media Gateway and a Media Gateway Controller with an initial key to validate digital signatures;
   said Media Gateway and said Media Gateway Controller performing a registration between the Media Gateway and the Media Gateway Controller and generating a shared key having a specific lifetime during the registration of said Media Gateway with said Media Gateway Controller by validating signaling messages used in the registration using the initial key, wherein the signaling messages include a parameter for generating the shared key and an initial digital signature generated by the initial key;
   for each call, said Media Gateway Controller and said Media Gateway authenticating a call message and a response message, each including a digital signature by using the shared key; and
   said Media Gateway and said Media Gateway Controller updating said shared key when the lifetime of said shared key is expired.

2. The method according to claim 1, characterized in that the step of said Media Gateway and said Media Gateway Controller performing the registration and generating the shared key comprises:
   the Media Gateway sending a register signaling message to said Media Gateway Controller, wherein said register signaling message includes a parameter for said Media Gateway Controller to generate the shared key and an initial digital signature generated by the Media Gateway using said initial key;
   said Media Gateway Controller validating the initial digital signature generated by the Media Gateway using the initial key;
   said Media Gateway Controller generating the shared key based on the parameter in said register signaling message and setting a lifetime of said shared key when the initial digital signature generated by said Media Gateway is validated;
   said Media Gateway Controller sending a modification command to said Media Gateway, wherein said modification command includes a parameter for said Media Gateway to generate the shared key, a digital signature generated by said Media Gateway Controller using said initial key, and the lifetime of said shared key;
   said Media Gateway validating the digital signature generated by said Media Gateway Controller by using said initial key; and
   said Media Gateway generating the shared key based on the parameter in said modification command and setting the lifetime, when the digital signature generated by said Media Gateway Controller is validated.

3. The method according to claim 1, characterized in that the step of said Media Gateway Controller and said Media Gateway authenticating the call message and the response message for each call comprises:
   said Media Gateway Controller attaching the digital signature using said shared key to the call message, wherein the digital signature is generated by the Media Gateway Controller and wherein the call message is transmitted to said Media Gateway;
   said Media Gateway validating said digital signature attached to said call message by using said shared key and returning a response message attached with a digital signature generated by the Media Gateway using said shared key to said Media Gateway Controller when said digital signature in said call message is validated; and
   said Media Gateway Controller validating said digital signature attached to said response message by using said shared key and establishing a call connection when said digital signature attached to said response message is valid, otherwise denying the call.

4. The method according to claim 1, characterized in that the step of said Media Gateway and said Media Gateway Controller updating said shared key comprises:
   sending a notification command by said Media Gateway to said Media Gateway Controller to request said Media Gateway Controller to generate a new shared key, wherein said notification command includes a parameter for said Media Gateway Controller to generate the new shared key and a digital signature generated by said Media Gateway using the initial key;
   said Media Gateway Controller validating the digital signature generated by said Media Gateway using said initial key;
   said Media Gateway Controller generating the new shared key based on the parameter in said notification command and setting a lifetime of said new shared key, when the digital signature generated by said Media Gateway is validated;
   said Media Gateway Controller sending a modification command to said Media Gateway, wherein said modification command includes a parameter for said Media Gateway to generate the new shared key, a digital signature generated by said Media Gateway Controller using said initial key and the lifetime of the new shared key;
   said Media Gateway validating the digital signature generated by said Media Gateway Controller by using said initial key; and
   said Media Gateway generating the new shared key based on the parameter in said modification command and setting the lifetime, when the digital signature generated by said Media Gateway Controller is validated.

5. The method according to claim 2, 3 or 4, characterized in that the algorithm used to generate a shared key by said Media Gateway Controller and said Media Gateway is different from the algorithm used to generate a digital signature by said Media Gateway Controller and said Media Gateway.

6. The method according to claim 2, 3 or 4, characterized in that a field or a packet of an expanded protocol is used to transmit said parameter for generating a shared key and said digital signature.

7. The method according to claim 1, characterized in that the lifetime of said shared key is time, or the number of times that said shared key can be used for authentication.

* * * * *